United States Patent
Nagashima

(10) Patent No.: US 6,340,974 B1
(45) Date of Patent: Jan. 22, 2002

(54) THREE-DIMENSIONAL IMAGE PROCESSING APPARATUS WITH BUMP IMAGE MODIFICATION

(75) Inventor: Hiroshi Nagashima, Takasho-machi (JP)

(73) Assignee: Shima Seiki Manufacturing, Ltd., Wakayama (JP)

(*) Notice: Subject to any disclaimer, the term of this patent is extended or adjusted under 35 U.S.C. 154(b) by 0 days.

(21) Appl. No.: 09/216,849

(22) Filed: Dec. 21, 1998

(30) Foreign Application Priority Data

Dec. 22, 1997 (JP) .............................................. 9-365797

(51) Int. Cl.$^7$ .............................................. G06T 11/40
(52) U.S. Cl. ........................ 345/584; 345/582; 345/552
(58) Field of Search ................................ 345/425, 430, 345/431, 432, 426, 427, 429, 581, 582, 584, 589, 552

(56) References Cited

U.S. PATENT DOCUMENTS

| 5,784,075 A | 7/1998 | Krech, Jr. .................... 345/516 |
| 5,808,619 A | 9/1998 | Choi et al. ................... 345/426 |

FOREIGN PATENT DOCUMENTS

| EP | 0454129 A2 | 4/1991 | |
| GB | 0 764 921 A1 | * 3/1997 | ........... G06T/15/50 |
| JP | HEI 8-263694 | 10/1996 | |
| JP | 08263694 A | * 10/1996 | ........... G06T/15/50 |

OTHER PUBLICATIONS

Peercy et al ("Efficient Bump Mapping Hardware: Proceedings of the 24th Annual Conference on Computer graphics and interactive techniques Aug. 3–8, 1997, Los Angeles, CA, USA).*

Schilling et al ("Towards real-time photorealistic rendering: challenges and solutions": 1997 SIGGRAPH: Eurographics workshop on Graphics Hardware, Aug. 3–4, 1997, Los Angeles, CA, USA).*

Bonnebroek K. et al: "Design principles of hardward–based phong shading and bump–mapping" Computers and Graphics, GB, Pergamon Press Ltd. Oxford, vol. 21, No. 2, Mar. 1, 1997, Pgs 143–149, XP004064042 ISSN: 0097–8493 *abstract* * p. 143, left–hand column, line 1–p. 144, left–hand column, line 26* *figures 2,3 *.

Zang J.J: "Least distorted bump mapping onto surface patches" Computers And Graphics, GB, Pergamon Press Ltd. Oxford, vol. 22, No. 2–3, Mar. 6, 1998, pp. 233–242, XP004145473 ISSN: 0097–8493 *abstract* *p. 233, left–hand column, line 1–p. 234, right–hand column, line 2*.

* cited by examiner

Primary Examiner—Mark Zimmerman
Assistant Examiner—Manlo Padmanabhan
(74) Attorney, Agent, or Firm—Arent Fox Kintner Plotkin & Kahn PLLC

(57) ABSTRACT

A bump image for a three-dimensional model of an object is stored and modified as well as a texture image in a rendering stage. A reverse mapping address to the texture image and the bump image is stored in a rendering memory to obtain a drawing object address for the texture image according to the address in the rendering memory.

4 Claims, 7 Drawing Sheets

30

THREE-DIMENSIONAL IMAGE PROCESSING APPARATUS WITH BUMP IMAGE MODIFICATION

FIELD OF THE INVENTION

The invention relates to an image processing apparatus, in particular to those capable of three-dimensional image rendering.

PRIOR ART

In three-dimensional image processing, normal vectors of polygons are derived by dividing a three-dimensional model of an object into multiple polygons. At the same time, a two-dimensional texture image is effectively affixed to the polygon surface by texture mapping of the two-dimensional texture image, where texture modification is possible as well as ordinary two-dimensional image modification, but the modification of a three-dimensional model is extremely difficult. Moreover, modeling of fine convexity and concavity of a three-dimensional model surface is also difficult. Therefore, a bump mapping technique has been proposed so as to notionally modulate convexity and concavity of the surface of an object by mapping a bump image which shows a modulation direction of a normal vector onto the surface of a three-dimensional object.

In bump image modification, it is necessary to imagine a display image obtained by rendering after mapping a bump image to an object surface to modulate the normal direction thereof. After the bump image is modified to some extent, the modified bump image is mapped again to the surface of a three-dimensional object and rendered again, and the modification result is then confirmed by seeing the display image. If any desirable modification has not been achieved, the bump image will be modified again. Accordingly, bump image modification would have to be repeated over again.

SUMMARY OF THE INVENTION

One object of the invention is to modify a bump image interactively with usage of a rendered image after mapping a bump image to an object so that the convexity and concavity are more easily represented and the modification result of the bump image is reflected on the display image with real time remapping and re-rendering.

It is an another object of the invention to facilitate the reverse mapping of the rendered display image to a texture image and a bump image so that more interactive bump image modification is achieved.

It is yet another object of the invention to modify a texture image and a bump image by the same processing system.

It is still yet another object of the invention to perform reverse mapping to a texture image and a bump image according to a common reverse mapping address system.

The present invention provides an image processing apparatus for mapping a two-dimensional texture image to a three-dimensional model of an object for displaying images by rendering. The processing apparatus includes:

bump memory for storing a bump image of said three-dimensional model;

modulation means for modulating the normal direction of said three-dimensional model according to the bump image:

mapping means for mapping said two-dimensional texture image onto the three-dimensional model with its normal direction modulated;

rendering means for obtaining and displaying a display image by rendering the three-dimensional model on which the two-dimensional texture image is mapped; and drawing means for specifying a position in said rendered image and modifying the bump image at the address in the bump memory corresponding to said specified position.

Here the texture image is a two-dimensional image showing the tint, shade, patterns and others of the object surface, and the bump image is, for example, a two-dimensional image for modulating the normal direction of a three-dimensional model of an object. And, in this specification, mapping is mapping of a texture image and a bump image to the surface of a three-dimensional object, and reverse mapping is mapping of a rendering image to a texture image and a bump image, and rendering is conversion of a three-dimensional image to a two-dimensional image in accordance with how an object looks from a view point. In one embodiment of the invention, the rendering means comprises a phong shading processor, a hidden surface processor, a rendering memory and a monitor.

Preferably, a rendering memory is provided for storing the display image obtained by rendering, whereby a reverse mapping address for reverse mapping of the display image to one of the texture image and the bump image is stored in said rendering memory.

Preferably, said drawing means for modification is selectively provided with one of said two-dimensional texture image and said bump image.

Preferably, means for obtaining normal vectors in two planes in regard to each position of said bump image and a reference table for obtaining a normal direction based upon the obtained two normal vectors are provided.

Preferably, the texture and the bump image are scaled, and they are stored in a common coordinate system.

According to the invention, the bump image of a three-dimensional model is stored in a bump memory for modifying the bump image interactively in the rendering process. If the bump image is modified, the normal direction of the surface in the three-dimensional model is modulated. The bump image after the modification is mapped to the object in real time, and the object to which a texture image is mapped is re-rendered for the display, therefore, the bump image is modified in real time with the convex and concave representation being modified. The bump image may be an image by each model or an image including a plurality of models.

Preferably, a reverse mapping address is stored in the rendering memory for the reverse mapping from the rendering image to one of the texture image and the bump image. Therefore, when the address for reverse mapping is read out from the rendering memory, the drawing address to the texture image or the bump image is obtained instantly, and the texture image or the bump image is modified in real time.

Preferably, one of the texture image and the bump image is provided to the common drawing means for modification. That is to say, texture image drawing, as well as bump image drawing, can be processed by the common drawing means.

Preferably, the normal vectors of the modulation direction of the object surface are derived from the bump image in regard to two planes, such as X-Z and Y-Z, and the normal direction of the bump image is obtained from the reference table according to the normal vectors. In this way, the normal direction is obtained without the outer product operation with high speed processing.

Preferably, the texture image and the bump image are scaled and stored in a common coordinate system. Accordingly, reverse mapping to both the texture image and the bump image is achieved by the same reverse mapping address.

BRIEF DESCRIPTION OF DRAWINGS

FIG. 10 is a diagram showing a pen shape used in bump image modification and so on.

PREFERRED EMBODIMENTS

Figure 1:
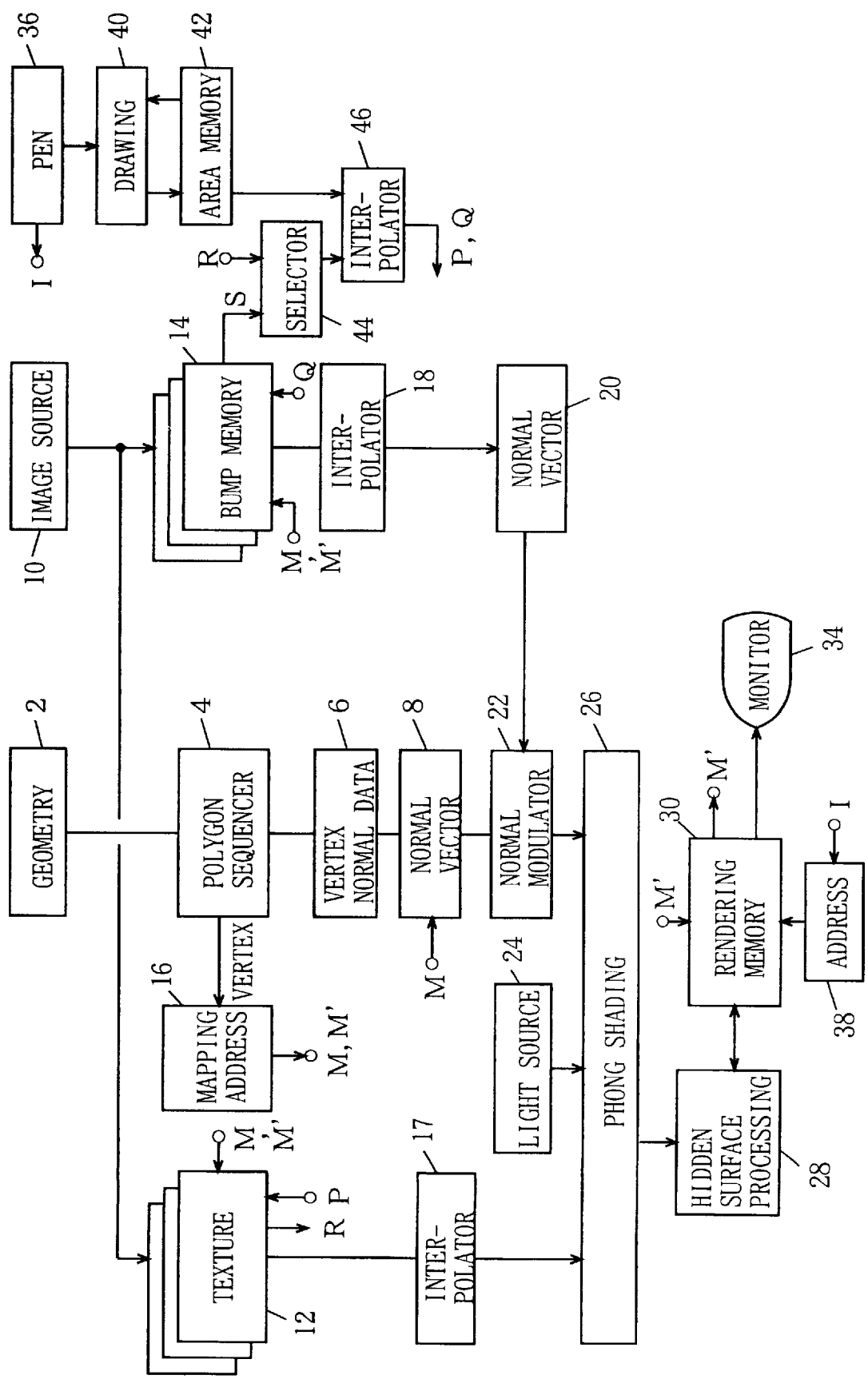
FIG. 1 is a block diagram of an main part of an image processing apparatus of an embodiment.

FIG. 1 through FIG. 9 illustrate an embodiment of the invention. FIG. 1 shows the outline of an image processing apparatus of the embodiment. In this embodiment, 2 is a geometry for dividing the object surface into multiple polygons, such as multiple triangles for example, based on the scene determination, and 4 is a polygon sequencer for providing the multiple triangles orderly. 6 is a vertex normal data operator for deriving the normal data, such as normal vector for example, of each vertex. 8 is a normal vector operator for deriving the normal vector of each pixel by interpolating the normal vector of three vertices for example.

10 is an image source for providing an original image of the two-dimensional texture image and an original image of the bump image using a scanner, a file storing two-dimensional images, or input-output devices for the file and so on. 12 is a texture memory for storing a plurality of texture images and having a plurality of planes for the texture images. 14 is a bump memory for storing two-dimensional bump images and having a plurality of planes as well. The bump image is, for example, a monochrome image, and the value of the image shows convexity and concavity of the object surface, defining the image as convex in a bright position and as concave in a dark position. What is significant in the bump image is its relative convexity and concavity for the surroundings. A texture image and a bump image are, even if they are plural, stored in a common coordinate system after being scaled and sized evenly except offset.

17 and 18 are interpolation processors, interpolating the image data of the memory 12 and 14 according to a subpixel address. 20 is a normal vector operator of a bump image as described below in detail with reference to FIG. 2. 22 is a normal vector modulator, modulating the normal vectors of each polygon by the normal vector obtained from the bump image.

24 is a light source adjustment, adjusting the three-dimensional position of the light source as well as the brightness and tone thereof. 26 is a phong shading processor, obtaining the brightness of each polygon using the modulated normal vector of each polygon and the light source position, and further considering the reflection between polygons. 28 is a hidden surface processor, obtaining, except for a polygon to be a hidden surface, a polygon which appears on the surface, and 30 is a rendering memory, storing the display image (rendering image) obtained by rendering to display the image on a monitor 34. And, in addition, the configuration of the rendering memory 30 is described below in detail with reference to FIG. 3.

36 is a drawing input means comprising the combination of a digitizer and a stylus for example, and displaying the drawing position on the monitor 34 with a cursor. In addition, the kind of the drawing input operation conducted in the drawing input means 36 is designated by a menu and so on which is controlled by a front end processor not shown. 38 is an address generator which converts the drawing position specified with the drawing input means 36 into the address in the rendering memory 30 for providing the address to the rendering memory 30. 40 is a drawing processor, which is an area memory for temporarily storing the image under the drawing operation. 44 is a selector, selecting a drawing object from one of the texture image and the bump image for example, and linearly interpolating the selected image and the drawing image stored in the area memory 42 by a linear interpolator 46 to write into the same memory again.

Furthermore, in FIG. 1, I shows a coordinate (drawing position) specified with the drawing input of a digitizer and so on, M shows a mapping address for mapping the texture image and the bump image to the object surface, and M' shows a reverse mapping address for the reverse mapping from the rendering image to the texture image and bump image. Furthermore, P and Q show the output of the linear interpolator 46, P shows the output to the texture image, Q shows the output to the bump image, R means input to the selector 44 from the texture image, and S means input to the selector 44 from the bump image.

Figure 2:
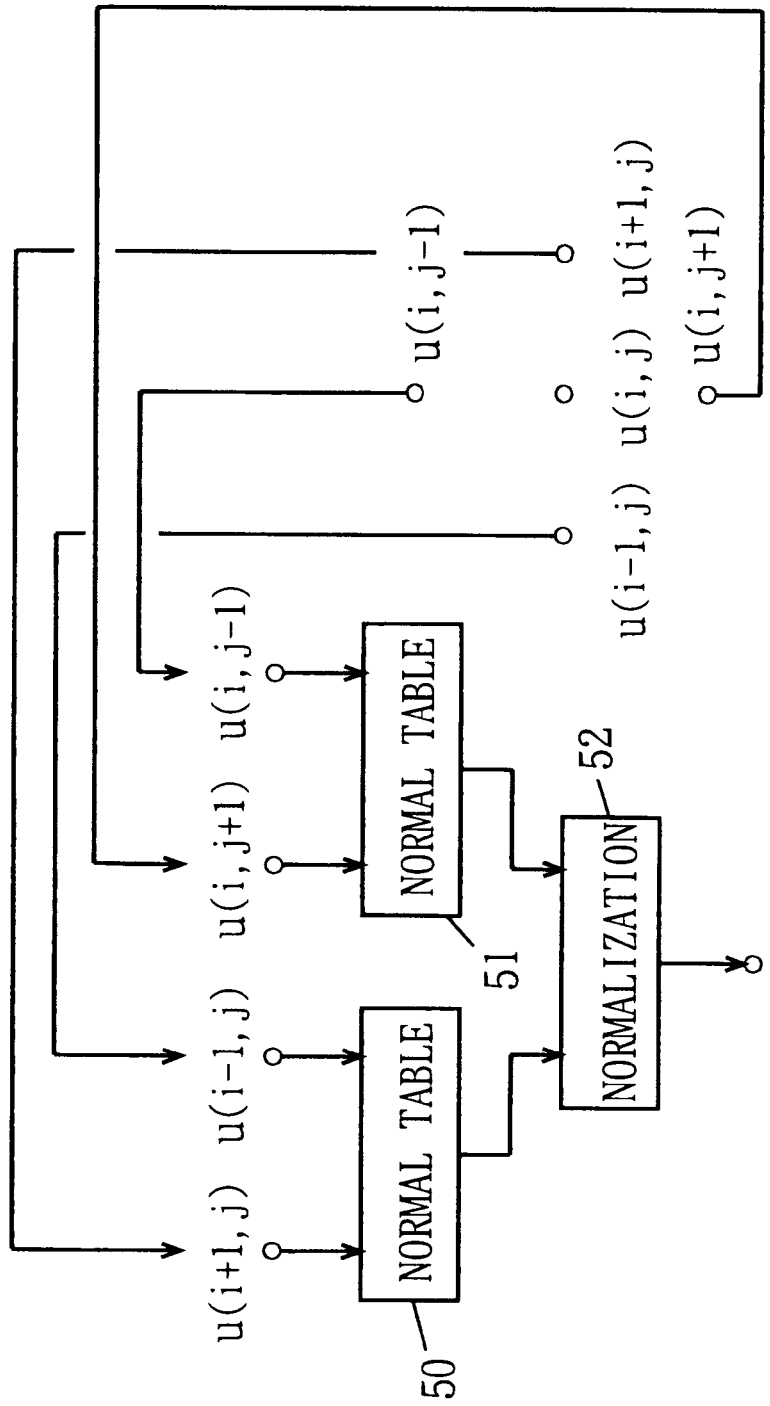
FIG. 2 is a block diagram of the normal vector operator in the embodiment.

FIG. 2 illustrates the configuration of the normal vector operator 20, and the coordinate of a pixel in the two-dimensional bump image is represented as (i, j). Using four adjacent pixels surrounding the pixel u(i, j) for obtaining the normal vector of the pixel u, for example, normal vectors in two perpendicular planes are derived with normal vector tables 50 and 51. The tangential vector in the i direction perpendicular plane is parallel to u(i+1,j)−u(i−1,j) and the normal vector is perpendicular to this. Therefore, the first normal vector nx is read out by the normal vector table 50 with usage of u(i+1, j) and u(i−1, j). In the same way, with usage of u(i+1,j) and u(i−1,j), the normal vector ny in the j direction perpendicular is read out. If these two normal vectors are normalized, normal vectors in three-dimensional space are obtained, and, with a normalization table 52, a vector corresponding to the formula below is read out to be represented as a normal vector:

$$N=(nx,ny)/(nx^2+ny^2)^{1/2}$$

Accordingly, the normal vector can be obtained without the outer product operation only by reading out from the tables 50, 51 and 52. Furthermore, the operation method itself of the normal vector is arbitrary.

Figure 3:
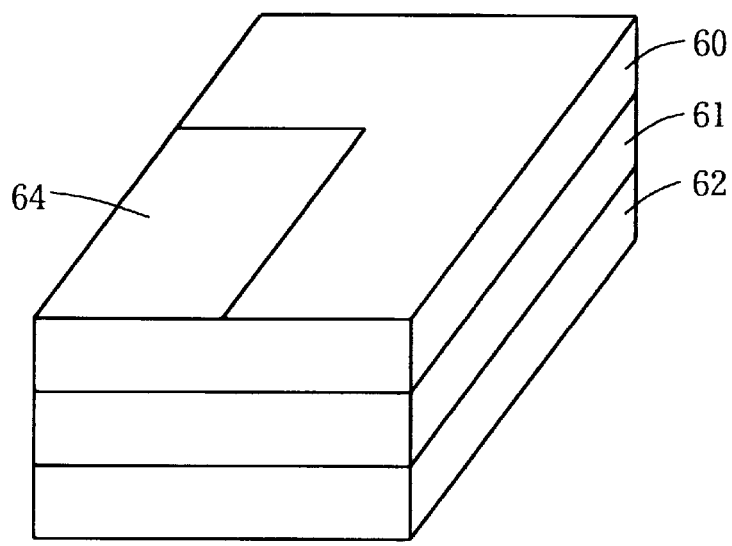
FIG. 3 is a diagram illustrating the data configuration of the rendering memory in the embodiment.

FIG. 3 illustrates the configuration of the rendering memory. 60 is a color data layer, 61 is a Z data layer, and 62 is a reverse mapping address layer, respectively storing an image data in 32 bit length after rendering for example. The color data layer 60 stores the color signal of each pixel in 24 bit length, each 8 bit for RGB respectively and stores the impearmeability of each pixel αin 8 bit length for example. In the Z data layer 61, the Z value specifies the surface position for the viewpoint in 32 bit length for example. That is, the smaller the Z value is, the closer to the viewpoint, and the larger the Z value is, the farther to the viewpoint. The reverse mapping address layer 62 stores the reverse mapping address M' for the reverse mapping of each pixel to the texture image and the bump image in 32 bit length for example. 64 is a display area in the rendering image, and the image in the display area 64 is displayed on the monitor 34.

When an object is added herein, the polygon Z value of the surface of the added object and the Z value of the Z data layer 61 are compared to set the smaller one as a visible surface and the larger one as a hidden surface. When the image of the color data layer 60 (color value C1) is set as a surface having impermeability α1 and when the added object surface polygon is set as a hidden surface having color value C2 and impermeability α2, the rendering image color value after the addition of the object is α1.

$$C1+(1-\alpha 1)\cdot \alpha C2$$

and the permeability is $$(\alpha 1+\alpha 2)-\alpha 1\cdot \alpha 2.$$

Here the impermeability 1 indicates a fully opaque condition exposing only the surface, and the impermeability 0 indicates a fully transparent surface condition. Furthermore, the reverse mapping address layer 62 is used in modifying the texture image and the bump image, and the address for reverse mapping to the texture image and the bump image from the drawing position in the rendering image is read out from the reverse mapping address layer 62.

Figure 4:
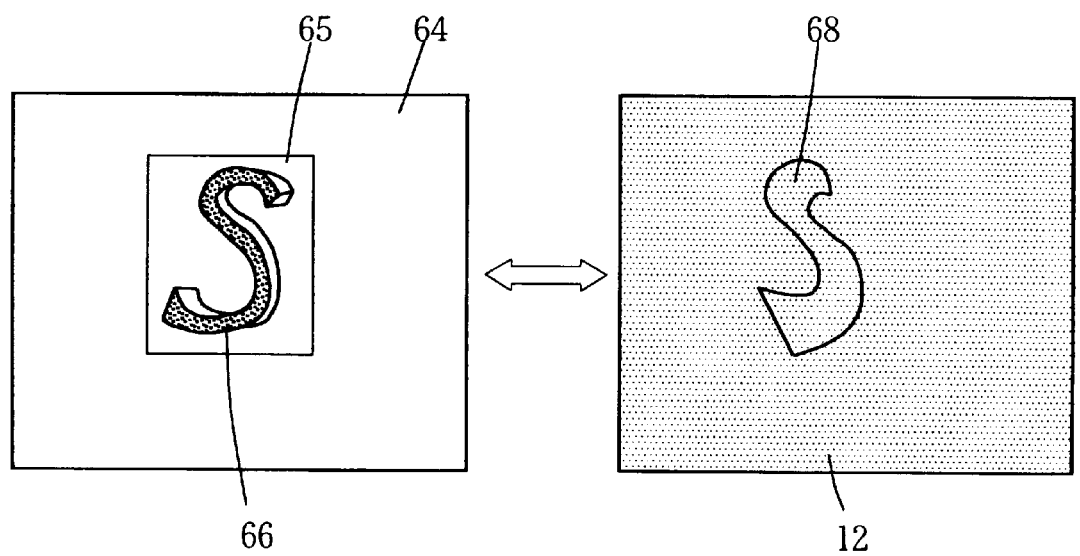
FIG. 4 is a diagram showing the relation between the rendering memory image and the texture image in the embodiment.

FIG. 4 shows the relationship between the rendering image and the texture image. 65 is a rendering area for rendering for example, and 66 is a display image. The display image 66 is made by pseudo-fixing the texture image 68 on the three-dimensional object surface polygon, and the texture image 68 is deformed on a basis of the texture mapping.

Figure 5:
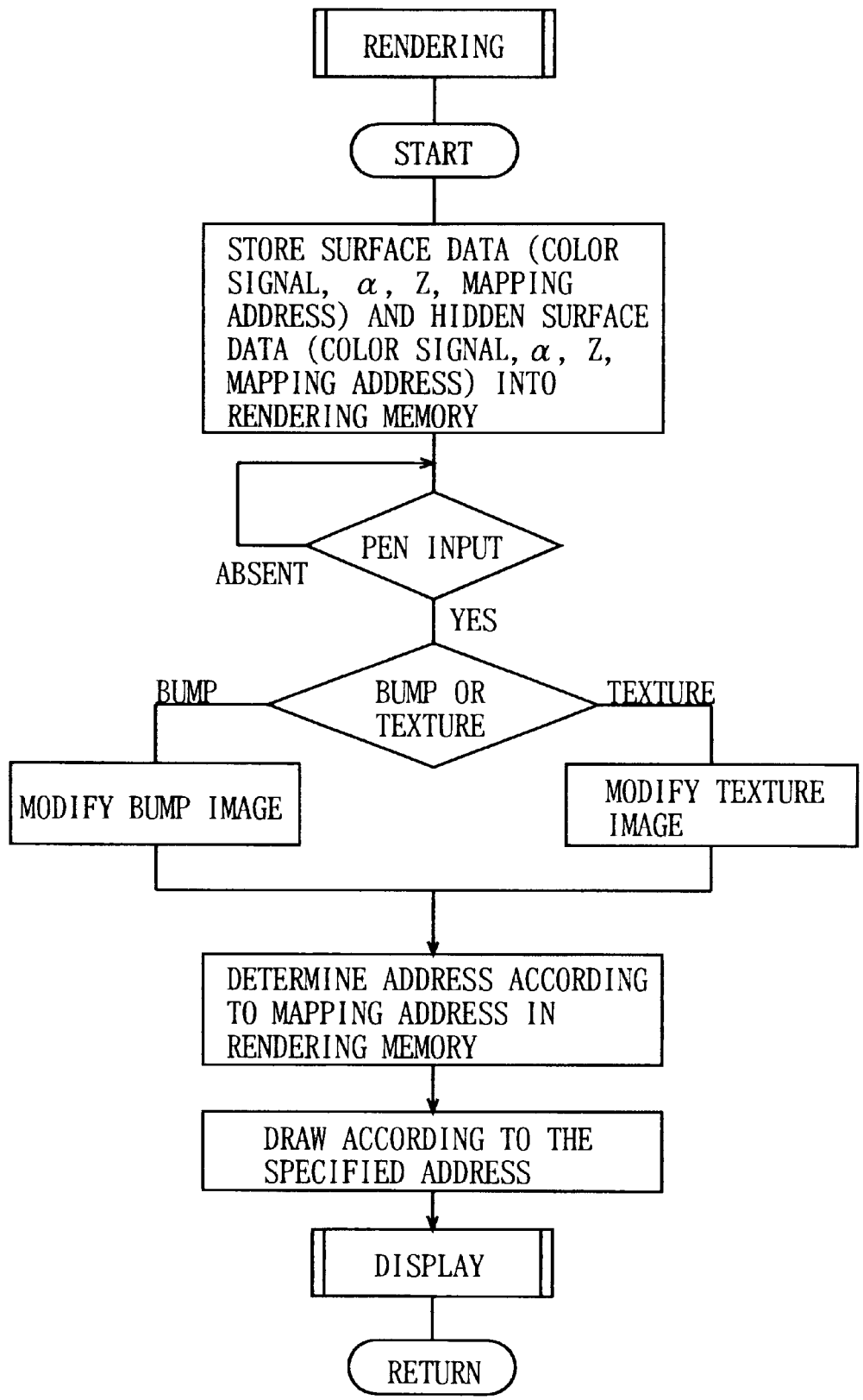
FIG. 5 is a flow-chart showing the rendering algorithm in the embodiment.

FIG. 5 shows a rendering algorithm of the embodiment of the invention. In a stage before rendering, a polygon data by which an object was divided into a multiple of polygons is provided from the sequencer 4 so that the three-dimensional coordinate of the vertex is found by the vertex normal data operator 6 while a normal vector of each pixel is found by the normal vector operator 8. Furthermore, original images of the texture image and the bump image are provided from the image source 10 to be stored in the texture memory 12 and the bump memory 14. Then, the mapping address generator 16 generates a mapping address M and a reverse mapping M'. The mapping address M indicates mapping of the texture image and the bump image on the polygon, and the reverse mapping address M' indicates reverse mapping from the rendering image to the texture image and the bump image. After interpolation of a subpixel coordinate in the interpolation processor 17 and 18 and modulation of the normal direction in the normal vector modulator 22, shading is conducted by the phong shading processor 26. Then, after the hidden surface processing is conducted by the hidden surface processor 28, the rendering image is stored in the rendering memory 30. At the same time, the reverse mapping address M' is stored in the rendering memory 30.

After the texture image and the bump image are mapped to a three-dimensional object, preferably, sizes and coordinate base (0-point) thereof are rescaled into a common coordinate system, and they are restored in one of the texture memory 12. When a plurality of texture images and bump images are present, the common coordinate system is used in regard to all the texture images and the bump images. Then, reverse mapping to all the texture images and the bump images may be easily conducted according to the common b reverse mapping address M'.

After rendering, drawing is conducted by the drawing input means 36. Then, after the selection by the selector 44 through the menu of which image of the bump image and the texture image should be processed, the selected image is modified.

Figure 10:
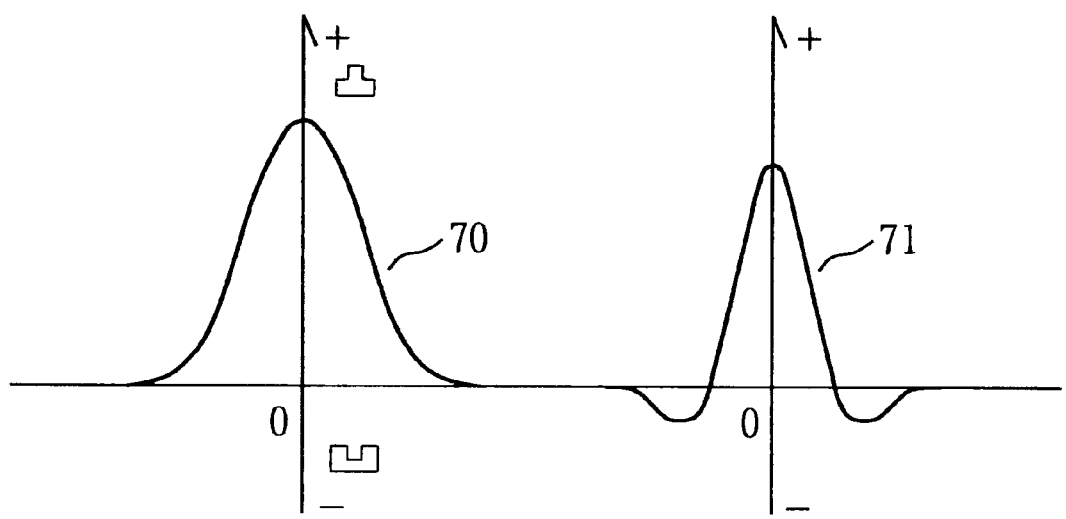

When drawing input is conducted herein, with usage of the drawing processor 40 and the area memory 42, the input drawing image for one stroke is obtained for example, mixed with one of the texture image and the bump image by the linear interpolator 46, and written back to the original address. Drawing both to the bump image and to the texture image is conducted by the common architecture, but the image for drawing is switched by the selector 44. In the drawing to the bump image, as well as the drawing to the texture image, a multiple of notional drawing tools (pens) may be prepared, one of which is selected on an unillustrated menu screen and so on, and a selected drawing tool is regarded as input from the drawing input 36. The distribution of the output density is shown in FIG. 10, where the Y axis represents the density, and the X axis represents the distance from the pen center. And, 70 shows a simple pen, and 71 shows an edge-emphasized pen with a trough in surroundings.

In the embodiment of the invention, since the reverse mapping address M' is stored in the rendering memory 30, the coordinate specified in the drawing input means 36 is converted into an address in the rendering memory 30 by the address generator 38, and, then, an address for reverse mapping is obtained from the reverse mapping address layer 62, and the reverse mapped data on the texture image and the bump image is provided from the selector 44 to the linear interpolator 46. That is, when a pen position is specified by the drawing input 36, it is converted to the rendering memory address, and reverse mapping is executed to the texture image and the bump image. Consequently, in the mapping address generator 16, no reverse mapping address calculation is necessary as a rule, and high speed calculation of a reverse mapping address is achieved. More interactive modification of the texture image and the bump image will be possible.

Then, the new image obtained in the linear interpolator 46 is written back to the original memories 12 and 14. At the same time, the corresponding polygons are re-rendered, and the color data and the impermeability in the rendering memory 30 are corrected with the correction result displayed on the monitor 34.

Figure 6:
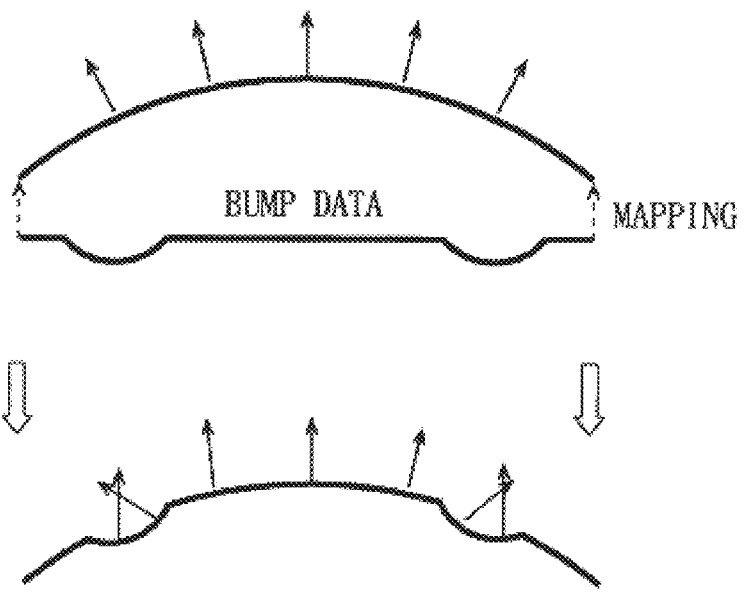
FIG. 6 is a diagram illustrating the functions of the bump image.

FIG. 6 shows the principle of bump mapping. In the top of FIG. 6, the direction of the object surface on a curve without bump is shown, and the arrow shows the normal vector of each part of the object surface. Below the top of FIG. 6, a data of the bump image is shown, for example, brightness and darkness values of the bump image show unevenness of the surface, where convex is for brightness, and concave for darkness. When a bump image is mapped on a curve without bump, namely, when the direction of the normal vector obtained in the curve without bump is modified according to the direction of the normal vector obtained from the bump image, the direction of the normal vector will change as shown in the bottom of FIG. 6. If there are two concaves in the bump image for example, the normal direction of the object surface in these parts may change as shown in the bottom of FIG. 6, which is equivalent to the modification of the normal direction of the object surface by the bump image. Then, the bump image modification can be conducted in real time in the rendering stage using the drawing input means 36, so that the convexity and concavity of the object surface can be modified for the rendered image. The resultant convexity and concavity of the modified bump image are displayed in real time on the monitor 34 so that the bump image can be modified with the modification result of the convexity and concavity.

Figure 7:
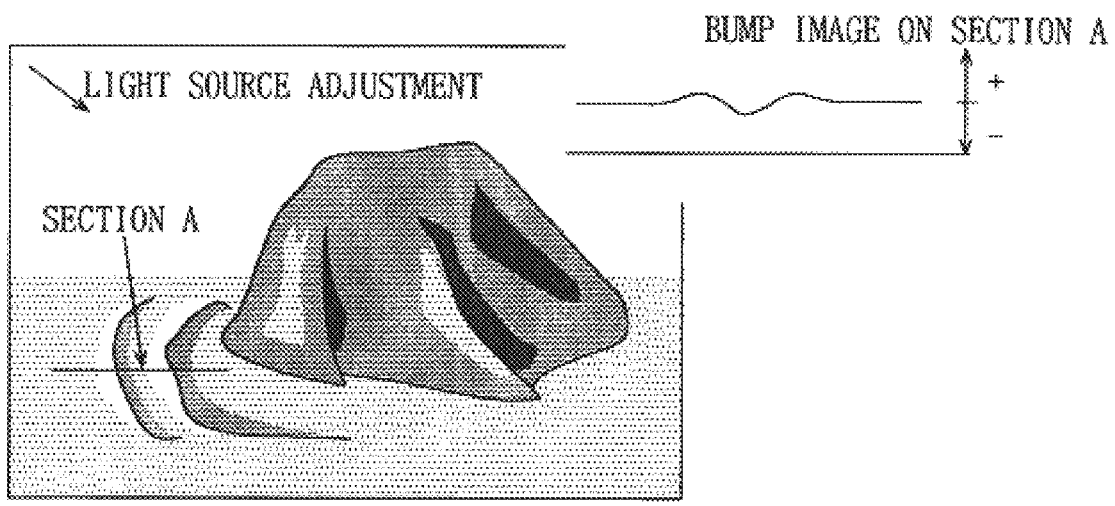
FIG. 7 is an explanatory drawing illustrating the functions of the bump image in the embodiment.
Figure 8:
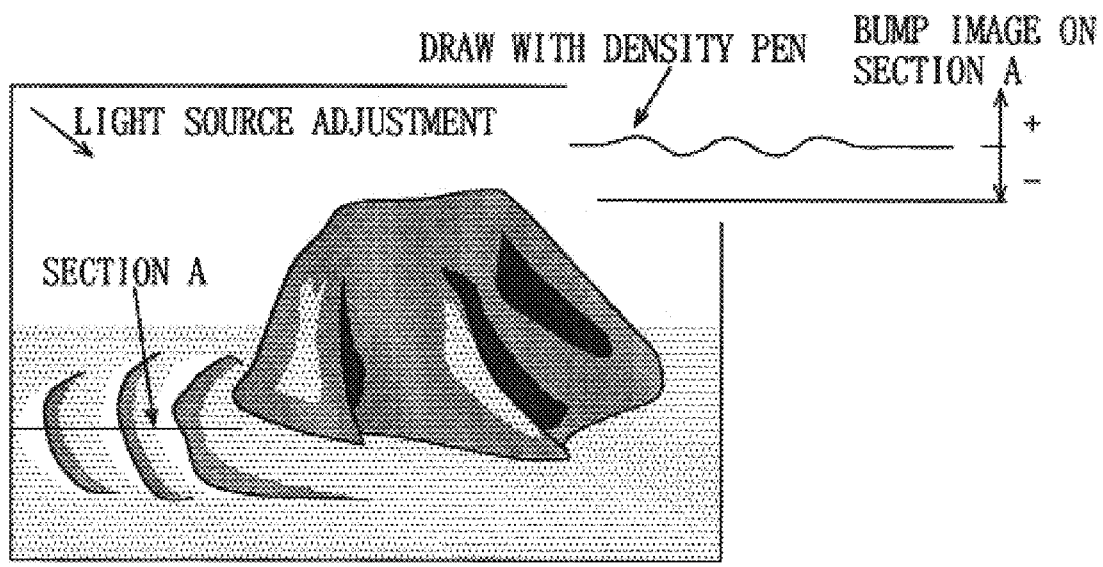
FIG. 8 is a diagram showing the display image after the bump image shown in FIG. 7 is modified.
Figure 9:
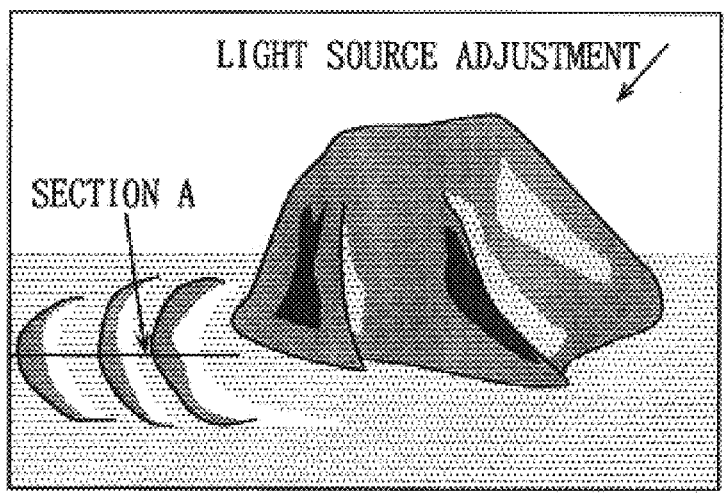
FIG. 9 is a diagram showing a display image after modifying the light source from one in FIG. 8.

FIG. 7 through FIG. 9 illustrate the function of the bump image, and FIG. 7 shows three objects of the sea surface, an island and the sky as a background. Accordingly, in the texture memory 12, there are stored three images of a sea surface image, an island image and a background sky image in three planes. The bump image is a monochrome image for example, the more convex for the surroundings, the brighter the image is, and the more concave for the surroundings, the darker the image is. The partial difference of the brightness and the darkness in the bump image shows the partial convexity and concavity of the object. When the bump image is modified, the bump memory 14 is selected by the selector 44, and is modified by the drawing input means 36 in the same way as a texture image.

Referring to FIG. 7, there are two waves on the sea surface, and, accordingly, so formed a bump image that the vertices of the waves become convex, and the space between the waves becomes concave. Here is used the drawing input means 36 so that one more wave may be added newly. Then, the bump image changes as illustrated in FIG. 8. In FIG. 7 and FIG. 8, the bump image is shown in the cross-sectional A direction. When the light source position is altered from the condition shown in FIG. 8 to one shown in FIG. 9, the normal direction of each object surface for the light source changes so that the brightness and darkness of the object change as shown in FIG. 9.

What is claimed is:

1. An image processing apparatus for mapping a two-dimensional texture image to a three-dimensional model, rendering the mapped image, and displaying the rendered image comprising:

a bump memory for storing a bump image of said three-dimensional model;

modulation means for modulating a normal direction of said three-dimensional model according to the bump image;

mapping means for mapping said two-dimensional texture image to said three-dimensional model having the modulated normal direction;

rendering means for rendering the three-dimensional model after said mapping and displaying the rendered image;

drawing means for specifying a position in said rendered image and modifying the bump image at the address in the bump memory corresponding to said specified position; and a rendering memory for storing said rendered image, wherein a reverse mapping address for reverse mapping said display image to said two-dimensional texture image and to said bump image is stored into said rendering memory.

2. An image processing apparatus of claim 1, further comprising selection means for selectively providing one of said two-dimensional texture image and said bump image to said drawing means.

3. An image processing apparatus of claim 2, further comprising; means for deriving normal vectors in two planes in regard to each position of said bump image; and a look-up table for deriving the normal direction of the bump image according to the derived two normal vectors.

4. An image processing apparatus of claim 1, wherein said texture image and said bump image are scaled and stored in a common coordinate system.

\* \* \* \* \*